United States Patent [19]

Masamura

[11] Patent Number: 4,715,048

[45] Date of Patent: Dec. 22, 1987

[54] FREQUENCY OFFSET DIVERSITY RECEIVING SYSTEM

[75] Inventor: Tatsuro Masamura, Tokyo, Japan

[73] Assignee: Canadian Patents And Development Limited, Ottawa, Canada

[21] Appl. No.: 858,915

[22] Filed: May 2, 1986

[51] Int. Cl.[4] .............................................. H04B 7/08
[52] U.S. Cl. ..................................... 375/100; 375/47;
375/101; 455/137; 455/276
[58] Field of Search ................ 455/132, 137, 139, 272,
455/273, 275, 276; 375/40, 79, 47, 100, 101

[56] References Cited

U.S. PATENT DOCUMENTS

| | | | |
|---|---|---|---|
| 3,383,599 | 5/1968 | Miyagi | 455/137 |
| 3,590,381 | 6/1971 | Ragsdale | 375/85 |
| 4,216,428 | 8/1980 | Tatsuzawa et al. | 455/137 |
| 4,397,036 | 8/1983 | Hirade et al. | 375/100 |

Primary Examiner—Benedict V. Safourek
Attorney, Agent, or Firm—Pascal & Associates

[57] ABSTRACT

A diversity receiving system for differential detection of minimum shift key (MSK) signals. The system may be advantageously implemented in order to realize high quality mobile satellite communication systems where shadowing is a significant problem and channel bandwidth and power are constrained. Signals from each of a plurality of receiving branches are translated to different intermediate frequencies which differ from each other by multiples of the transmitted signal symbol rate. The intermediate frequency signals are summed and detected via a common differential detector, the latter being followed by a low pass filter having a bandwidth corresponding to a fraction of the symbol rate. The plural signals are easily and stably combined at an intermediate frequency stage without phase adjusters, signal quality measurement circuits or switching controllers. Moreover, the error rate performance is equivalent to that of post detection equal gain combining diversity schemes, which require plural complete receiving systems.

18 Claims, 4 Drawing Figures

FREQUENCY OFFSET DIVERSITY RECEIVING SYSTEM

BACKGROUND OF THE INVENTION

This invention relates in general to radio signal receiving systems of the space diversity type and more particularly to a frequency offset receiver utilizing differential detection.

One of the difficulties in UHF and VHF mobile radio environments, such as satellite systems, is that line of sight communications rarely occur. A received radio signal is typically the vector sum of reflections from near-by objects and is therefore subject to rapid and deep multipath fading as the receiver moves. In order to realize a high quality mobile radio system, it is important mitigate the communication degradation caused by this fading.

Various techniques have been utilized in the past to overcome the problem of multipath fading. One such successful technique is known as diversity, wherein two or more independent samples of a transmitted signal are received. Frequency, time, and space diversity have all been successfully employed to overcome the multipath fading problem. Frequency and time diversity are accomplished by retransmitting information on a separate frequency or at a delayed time, respectively, requiring considerable bandwidth and power to implement. Space diversity, on the other hand, simply requires two or more signal receiving antennas spaced sufficiently apart so that their fading patterns are independent. It has been shown that space diversity yields better reception than frequency or time diversity, and is the preferred technique where channel bandwidth and power are constrained, such as in satellite systems.

Three common techniques have been employed for combining the received signals from multiple antennas of a space diversity system; selection combining, maximal-ratio combining, and equal gain combining.

Selection combining is a technique for selecting, in real time, the best signal among a plurality of signals received from respective antennas. According to this technique, the strongest signal is accepted and the weaker signals are rejected. The selection combining technique is simpler to implement than maximal-ratio or equal gain combining techniques, but is inferior in terms of performance gain. In order to avoid switching noise, it is necessary to perform switching subsequent to demodulation, requiring expensive parallel complete receiving systems. Also, complex and expensive signal quality detection and switching controller circuits are typically required.

According to the equal gain combining technique, intermediate frequency (IF) signals are generated having equal frequencies and phase such that the IF signals can be combined in phase and at the same relative level as they are received. The combined output signal is monitored to provide automatic gain control of the IF amplifiers in each of the receiving branches, to ensure a constant amplitude. However, this technique requires complex carrier phase adjustment of each signal or, alternatively combination of the signals after demodulation via parallel complete receiving systems.

The maximal-ratio combining technique affords the best results in signal reception reliability. This technique is similar to equal gain combining except for the method of controlling the gain for each IF signal. Equal gain combining requires that the relative gain for each IF signal be the same, whereas maximal-ratio combining requires that the gain for each IF signal be proportional to the received signal level itself. A weaker signal is controlled to contribute a proportionally smaller amount of itself to the resultant common IF output signal, than does a stronger signal. Thus, it is necessary to measure the signal-to-noise ratio of each branch and to change the gain for each branch instantaneously, in order to get the maximum signal-to-noise ratio by combining them. It is also necessary to adjust the carrier phase of each signal if the signals are combined before demodulation. In order to remove this complex phase adjuster, the signals can be combined after demodulation, as in the case of equal gain combining, but in this case parallel complete receiving systems are also required.

A transmitter diversity technique has been disclosed in an article entitled A TRANSMITTER DIVERSITY FOR MSK WITH TWO BIT DIFFERENTIAL DETECTION, by Murota et al., reprinted from the IEEE International Conference on Communications, ICC 1982, June 13-17, 1982, Philadelphia, Pa. According to this article, two signals are received by a single antenna. Their multipath fading patterns are independent, resulting in improved signal detection in the event of multipath fading. However, the two signals are also subjected to shadowing, resulting in decreased reception quality. Also, the technique of Murota et al. suffers from the disadvantage of requiring two separate radio channels, which is a disadvantage in most mobile radio systems wherein channel bandwidth is constrained.

SUMMARY OF THE INVENTION

An object of the present invention is to provide a diversity receiving system for receiving digital radio signals transmitted according to minimum shift keying (MSK) modulation techniques at a predetermined signal symbol rate on a plurality of different paths through a dispersive medium.

Another object of the present invention is to provide a diversity receiving system which reduces manufacturing costs by eliminating expensive items such as measurement circuits for received signal-to-noise ratio, switching controllers, phase adjusters and plural complete receiving systems.

Yet another object of the present invention is to provide a digital diversity receiving system for receiving an MSK digital data signal capable of being employed in a space diversity communication system such as a mobile satellite system.

According to the present invention, there is provided a diversity receiving system for receiving a minimum shift key (MSK) modulated data signal transmitted at a predetermined signal symbol rate, comprised of a plurality of receiving branches. The receiving branches are comprised of a plurality of spaced apart antennas for receiving the data signal via a plurality of transmission paths, and mixers for frequency translating the received signal from respective ones of the antennas and generating respective intermediate signals having frequencies displaced from each other by an integral multiple of the signal symbol rate. The system also includes circuitry for combining the intermediate signals, a differential detector for receiving the combined signals, delaying the combined signals by one symbol period and multiplying the combined signals by the delayed versions thereof, and generating output cross product signals in response thereto. A low pass filter is also included for combining the output cross product signals from the plurality of branches, filtering interference components of the cross product signals and generating a coherent output data signal in response thereto.

The signal elements from all branches of the previous period mix in the differential detector with the elements from all branches of the present period, yet only the cross products of each branch's delayed sample with its present sample actually pass through the low pass filter. Each branch thus forms its own cross product essentially independently of the differential detector.

As a result of the integral symbol rate frequency offset, the cross products are coherent and can be directly added in the low pass filter. In the event of equal signal strength and signal-to-noise ratio in each branch, the coherent signal addition and associated non-coherent noise addition results in a signal-to-noise ratio proportional to the number of independent branches.

BRIEF DESCRIPTION OF THE DRAWINGS

The above mentioned and other features and objects of this invention will become more apparent by reference to the following description taken in conjunction with the following drawings, in which.

DESCRIPTION OF THE PREFERRED EMBODIMENT

According to the radio environment in which the system of the present invention operates, an MSK type modulated data signal is produced in a modulator/transmitter. According to well known MSK type continuous phase frequency shift keying (CPFSK) the phase of a generated carrier signal is a continuous function of time while the nominal carrier frequency is equal to the arithmetic mean of the two frequencies that are used to represent the digital symbols 1 and 0.

After modulation, as described above, the MSK signal is transmitted at a suitable RF frequency toward the troposphere, or some other dispersive medium, and due to the dispersive action of this medium or to the reflection by the earth's surface, there will be developed a plurality of different paths over which the MSK digital data signal is propagated.

Figure 1:
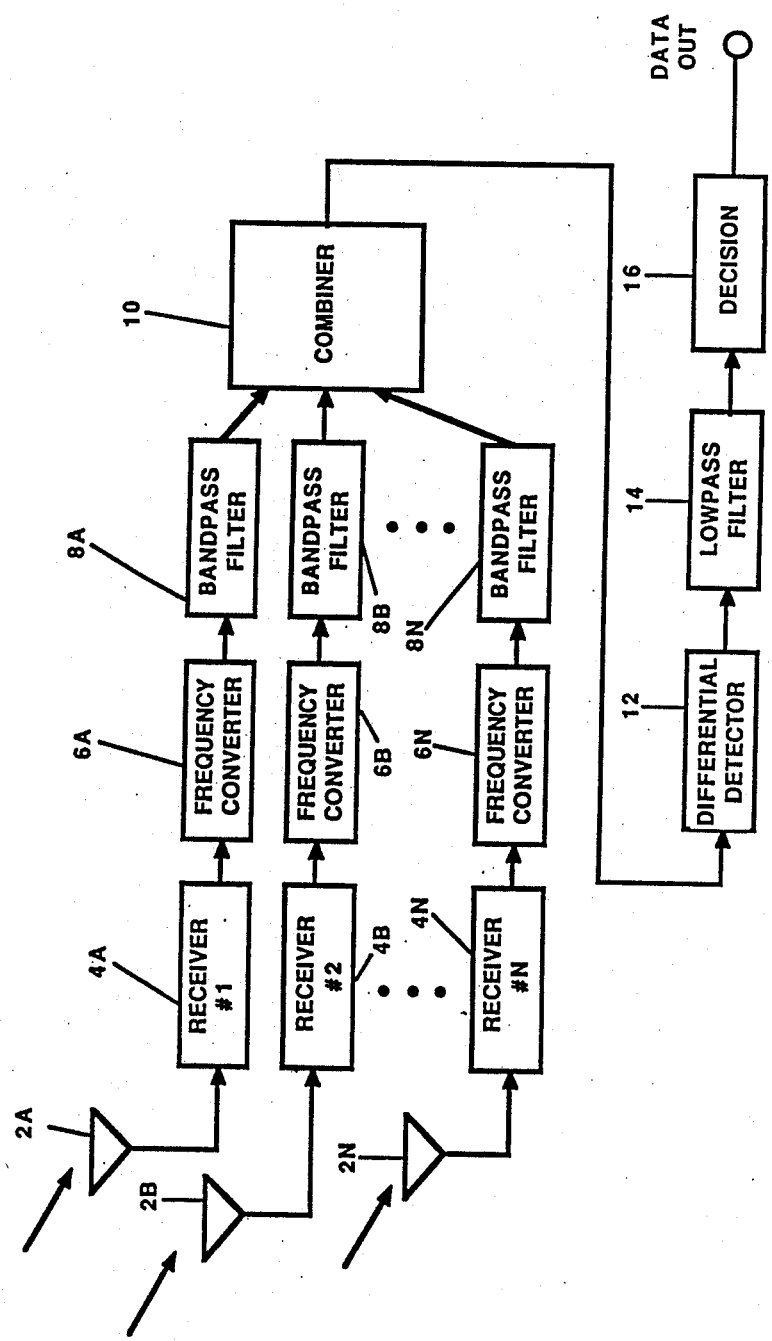
FIG. 1. is a block diagram of a digital diversity receiving system according to the present invention in its most general form.

With reference to FIG. 1, there is disclosed a diversity receiving system having a plurality of branches for receiving the data signal propagated on the different paths. Each of the branches incorporates an antenna 2A, 2B, . . . 2N for receiving the RF modulated data signal, designated as $f_o$, from its associated one of the plurality of paths, and a receiver 4A, 4B, . . . 4N for amplifying the received signal. The received data signal $f_o$ in each of the branches, is transmitted to respective associated frequency converters 6A, 6B, . . . 6N, each of which typically includes a mixer and a local oscillator, described in greater detail below with reference to FIG. 2.

The function of the frequency converter 6A, 6B, . . . 6N in each of the signal branches is to convert the RF signal conveying data in MSK type modulation form to a suitable intermediate frequency.

The output of each of the frequency converters 6A, 6B, . . . 6N is an intermediate ($IF_1$, $IF_2$, . . . $IF_n$) signal, each having a frequency which differs from the others by a multiple of the transmitted symbol rate. The IF signals are filtered via band-pass filters 8A, 8B, . . . 8N and summed in a combiner circuit 10.

The combined signals from combiner circuit 10 are applied to a differential detector 12 followed by a low pass filter 14 having a bandwidth equal to a fraction of the symbol rate. The low pass filter 14 is followed by a decision circuit 16 for generating a logic 1 value in response to detection of a positive voltage from filter 14, and a logic 0 value in response to detection of a negative voltage, comprising a final output data signal.

The differential detector 12, which for illustrative purposes is assumed to be a one bit differential detector, delays the combined signal applied thereto with respect to the previous signal symbol period and multiplies it with the present signal. In general, without any constraint on the value of the carrier signal frequency, the delayed MSK signal is also typically phase shifted by 90° prior to multiplication with the combined signal. However, in the event the carrier frequency and time delay conform to a predetermined relationship (discussed in detail below), the 90° phase shift can be eliminated.

The signal elements from all branches from the previous periods thus mix with the elements from all branches of the present period, but the only cross products which are passed through low pass filter 14 are those of each of the branch's delayed sample times its own present sample. Thus, interference between the data signals carried by respective ones of the signal paths is substantially eliminated. Each branch thus forms its own cross product essentially independently in the differential detector 12.

As a result of the integral symbol rate frequency offset generated by frequency converters 6A, 6B, . . . 6N, the cross products are coherent and can be directly added in low pass filter 14. The coherent signal addition and associated noncoherent noise addition results in a signal-to-noise ratio proportional to the number of independent branches, which is comparable to reception via post demodulation detection, equal gain combining diversity systems.

MSK signals can be expressed as:

$$s(t) = Re[\sqrt{2S} \exp j(2\pi f_c t + \pi d_k t/2T + x_k)] \tag{1}$$

where S is the signal power, $f_c$ is the carrier, or center frequency, T is the signaling interval of a transmitted symbol, $d_k$ is either $+1$ or $-1$ depending upon whether the data which is transmitted at the rate $C=1/T$ is '1' or '0', and the values of $x_k$ are determined by the requirement that the phase of the waveform be continuous at every transmission instant $t=kT$. Defined as follows, $$\theta(t)=x_k+(\pi d_k/2T)t \tag{2}$$

is a piecewise linear phase function of the MSK waveform in excess of the linearly increasing phase of the carrier term.

Over each signaling interval T, the phase of the MSK waveform is advanced or retarded precisely $\pi/2$ with respect to the carrier phase, depending upon whether the data for that interval is '1' or '0' respectively.

The input of the differential detector 12, which is typically comprised of a delay line with a time delay $\tau$, a product demodulator, followed by a low pass filter 4, can be represented by:

$$r(t) = s(t) + n(t), \quad (3)$$

where s(t) is the received MSK signal. The term n(t), which designates additive narrow-band Gaussian noise, can be represented as:

$$n(t) = Re[Z_n(t) \exp j2\pi f_c t], \quad (4)$$

where $Z_n(t)$ is the complex envelope of the Gaussian noise. Using Eq. (1), (2), (3) and (4), r(t) can be represented as:

$$r(t) = Re[Z \exp j2\pi f_c t],$$

where Z(t) is given as:

$$Z(t) = \sqrt{2S} \exp j\theta(t) + Z_n(t).$$

The detector output is given by:

$$v(t) = (\tfrac{1}{2}) Re[Z(t) Z^*(t - \tau) \exp j2\pi f_c \tau]$$
$$= \tfrac{1}{2}[r(t) r(t - \tau)]$$
$$= S[\cos(2\pi f_c t + \theta(t))][\cos(2\pi f_c (t - \tau) + \theta(t - \tau)],$$

where the asterisk symbol denotes a complex conjugate.

Under noise-free conditions, the filtered output, designated as $v_o(t)$, can be represented by:

$$v_o(t) = S \cos[2\pi f_c \tau + \theta(t) - \theta(t-\tau)].$$

Setting $f_c$ and $\tau$ as:

$$\tau = m'T, \text{ and}$$

$$2f_c\tau = 2m - \tfrac{1}{2},$$

where m' and m are positive integers, and m' is consistent with the delay of an associated differential encoder at the transmitter, the phase difference over the delay period m'T, can be detected. When the detector output is positive at the end of the signaling interval, '1' is chosen by decision circuit 16, and when it is negative, '0' is chosen, which is equal to the transmitted data m in the case where m' is 1. Thus, it can be seen that MSK signals can be demodulated by using the conventional differential detector for binary signals.

Figure 2:
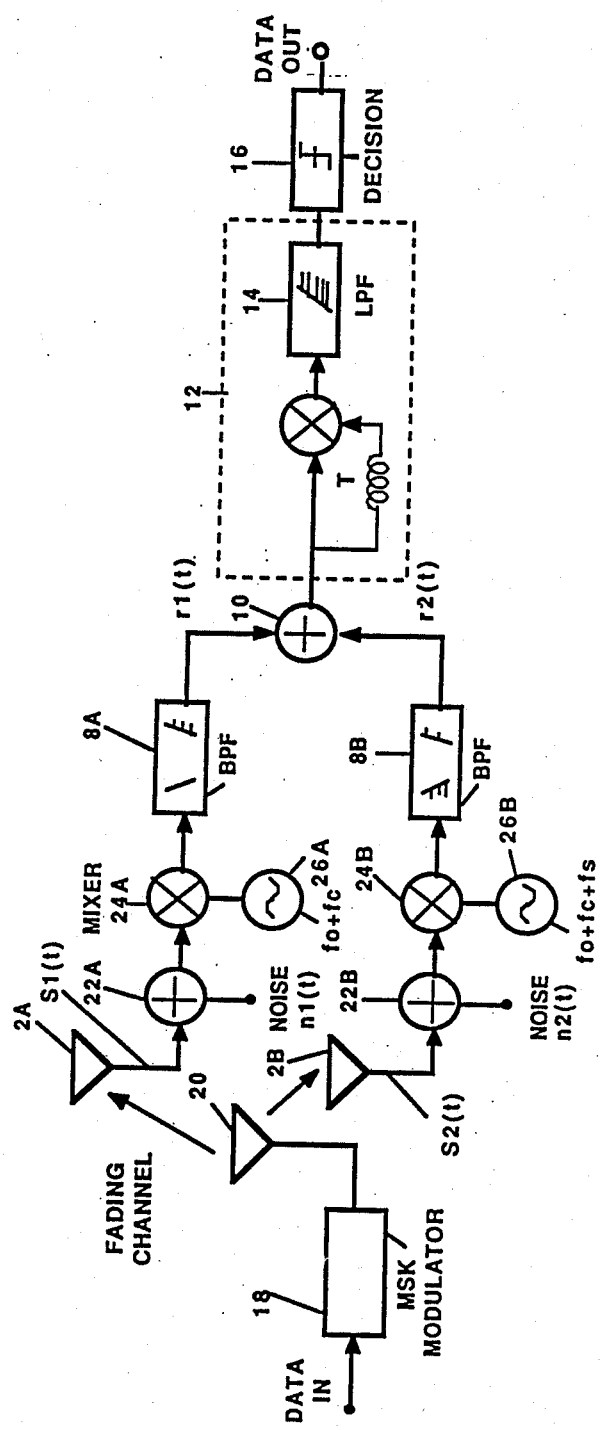
FIG. 2 is a schematic block diagram illustrating the receiving system according to the preferred embodiment of the present invention.

FIG. 2 illustrates a frequency offset diversity receiver system according to the preferred embodiment of the invention. As discussed above, input data is modulated via an MSK modulator 18 and transmitted via antenna 20 to a dispersive medium. Each of the receiving branches is comprised of an antenna (eg. 2A and 2B) for receiving signals (eg. $S_1(t)$ and $S_2(t)$). For simplicity of description only two signal branches are shown. In fact, a plurality of such branches are typically utilized for best results, as shown in FIG. 1.

Front-end additive narrow band Gaussian noise is typically added to the system from external sources, and is denoted via summing circuits 22A and 22B. Mixers 24A and 24B mix the received signals with output signals generated via local oscillators 26A and 26B.

A key element of the present invention is that the frequency of the local oscillator 26B for the second branch is offset from that of the first branch oscillator 26A by a frequency denoted as $f_s$, equivalent to the transmitted signal symbol rate. The resulting intermediate frequency IF signals thus also differ in frequency from each other by $f_s$. The IF signals are filtered by bandpass filters 8A and 8B, combined in combiner circuit 10 and applied to differential detector 12, which preferably is in the form of a phase detector.

As discussed above with reference to FIG. 1, differential detector 12 is followed by a low pass filter 14 and a decision circuit 16. Low pass filter 14 has a bandwidth equal to a fraction of the symbol rate.

The outputs of the two narrow bandpass IF filters 8A and 8B with different center frequencies at $f_c$ and $f_c + f_s$, can be represented as:

$$r_1(t) = s_1(t) + n_1(t),$$

$$r_2(t) = s_2(t) + n_2(t).$$

Here $s_1(t)$ and $s_2(t)$, which are MSK signals, may be represented as:

$$s_1(t) = Re[Z_{S1}(t) \exp j[2\pi f_c t + \theta(t)]]$$

$$s_2(t) = Re[Z_{S2}(t) \exp j[2\pi (f_c + f_s)t + \theta(t)]]$$

where, $Z_{S1}(t)$ and $Z_{S2}(t)$ are complex random variables representing the effect of fading of the channels. $n_1(t)$ and $n_2(t)$, which are front-end additive narrow band Gaussian noise, can be represented as:

$$n_1(t) = Re[Z_{n1}(t) \exp j2\pi f_c t]$$

$$n_2(t) = Re[Z_{n2}(t) \exp j[2\pi (f_c + f_s)t]]$$

where, $Z_{n1}(t)$ and $Z_{n2}(t)$ are complex envelopes of the Gaussian noise.

By summing $r_1(t)$ and $r_2(t)$, the input signal to differential detector 12 is obtained as follows:

$$r(t) = Re[Z_1(t) \exp j2\pi f_c t + Z_2(t) \exp j[2\pi (f_c + f_s)t]]$$

$$= Re[Z(t) \exp j2\pi f_c t]$$

where, $Z_1(t)$, $Z_2(t)$ and Z(t) are given by $$Z_1(t) = Z_{S1}(t) \exp j\theta(t) + Z_{n1}(t)$$

$$Z_2(t) = Z_{S2}(t) \exp j\theta(t) + Z_{n2}(t)$$

$$Z(t) = [Z_{S1}(t) + Z_{S2}(t) \exp j2\pi f_s t] \exp j\theta(t) + Z_{n1}(t) +$$

$$Z_{n2}(t) \exp j2\pi f_s t.$$

The differential detector 12 output signal v(t), is given by:

$$v(t) = (\tfrac{1}{2}) Re[Z(t) Z^*(t - \tau) \exp j2\pi f_c \tau]$$

$$= (\tfrac{1}{2}) Re[Z_1(t) Z_1^*(t - \tau) \exp j2\pi f_c \tau +$$

$$Z_2(t) Z_2^*(t - \tau) \exp j2\pi (f_c + f_s)\tau +$$

$$Z_1(t) Z_2^*(t - \tau) \exp j2\pi [-f_s t + (f_c + f_s)\tau] +$$

-continued $$Z_2(t) Z_1^*(t - \tau) \exp j2\pi(f_s t + f_c \tau)].$$

The third and fourth terms of the equation representing v(t) are interference components between the two received signals with a beat frequency due to the carrier frequency offset, $f_s$. These signals are suppressed by the low pass filter 14 following the detector 12.

By setting $f_s = n/\tau$, where n is an arbitrary positive integer and is large enough so that the low pass filter 14 can suppress the interference components without degradation of the desired signals, the output from filter 14, $v_0(t)$, becomes:

$$v_0(t) = (1/2) \operatorname{Re}[[Z_1(t)Z_1^*(t-\tau) + Z_2(t)Z_2^*(t-\tau)]\exp j2\pi f_c \tau].$$

It has been found that this result is identical to that achieved with the prior art system of Murota et al, which utilizes differential detection and transmitter diversity using two different carrier frequencies. The result is also the same as the conventional post detection equal gain combining diversity demodulation which uses separate differential detectors.

According to the present invention, a new diversity receiving system is proposed for differential detection of minimum shift key (MSK) signals. The system may be advantageously implemented in order to realize high quality mobile satellite communication systems where shadowing is a significant problem and channel bandwidth and power are constrained. Signals from each of a plurality of receiving branches are translated to different IF frequencies. The IF signals are summed and then detected by a common differential detector. The plural signals are easily and stably combined at an IF stage without phase adjusters, signal quality measurement circuits or a switching controller, as required by prior art systems. Moreover, the error rate performance is equivalent to that of post detection equal gain combining diversity schemes, which require plural complete receiving systems.

Also, the present invention exhibits improvements over the prior art technique of Murota et al, which uses two different carrier frequencies, since the two received signals are also subjected to shadowing, which problem is overcome by the present invention. Also, the Murota et al technique requires two radio channels, whereas the present invention requires only one, which is an advantage in satellite systems where bandwidth is constrained.

A person skilled in the art understanding the present invention, may conceive of further embodiments or variations thereof.

For instance, a plurality of phase shifters for generating phase shifted signals $f_o, f_o + \Delta f, \ldots, f_o + n\Delta f$, may be disposed in respective branches before the combiner circuit 10, in lieu of the aforementioned frequency converters. The frequency offset signals may then be combined in circuit 10, amplified in a receiver and filtered via a single bandpass filter and applied to the differential detector 12.

Figure 3:
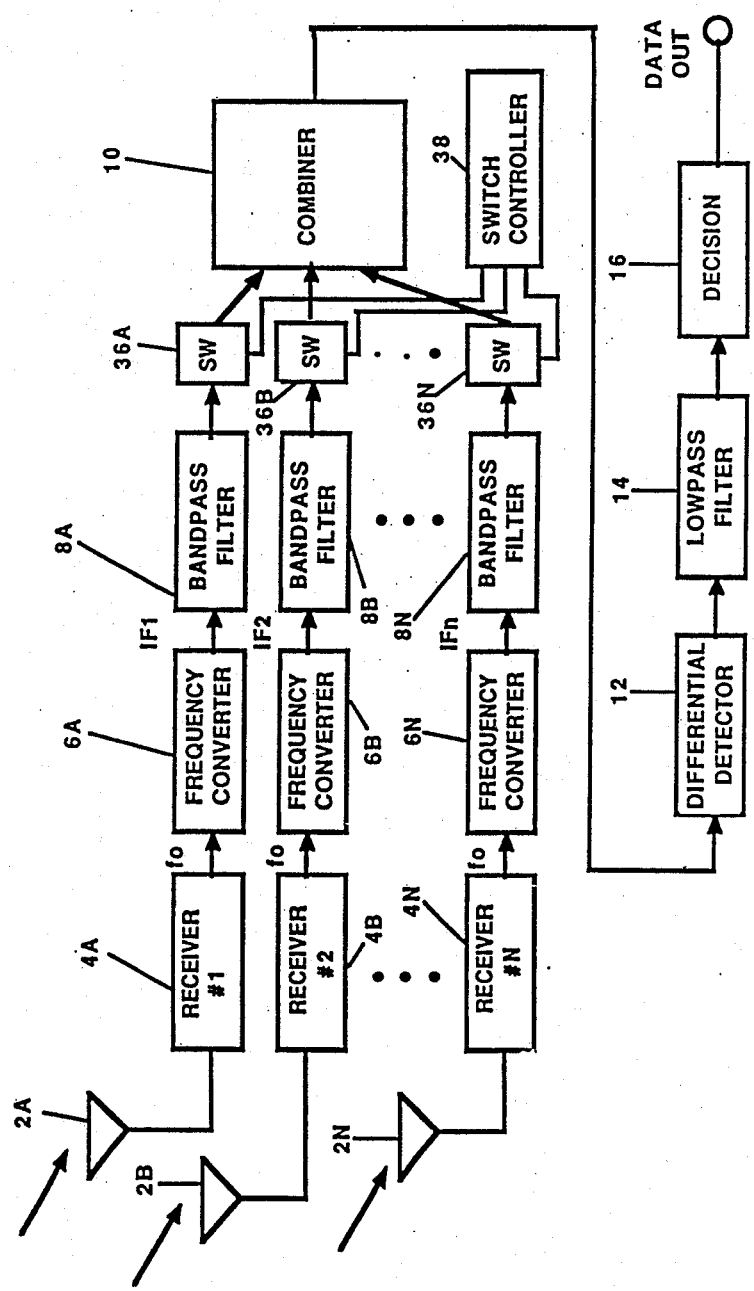
FIG. 3 is a block diagram illustrating an alternative embodiment of the receiving system.

An alternative embodiment is illustrated in FIG. 3, wherein a plurality of switches 36A, 36B, . . . 36N are disposed between adjacent ones of the bandpass filters 8A, 8B, . . . 8N and combiner circuit 10. The switches are controlled via a switch controller 38 for disconnecting branches carrying heavily faded signal components.

Figure 4:
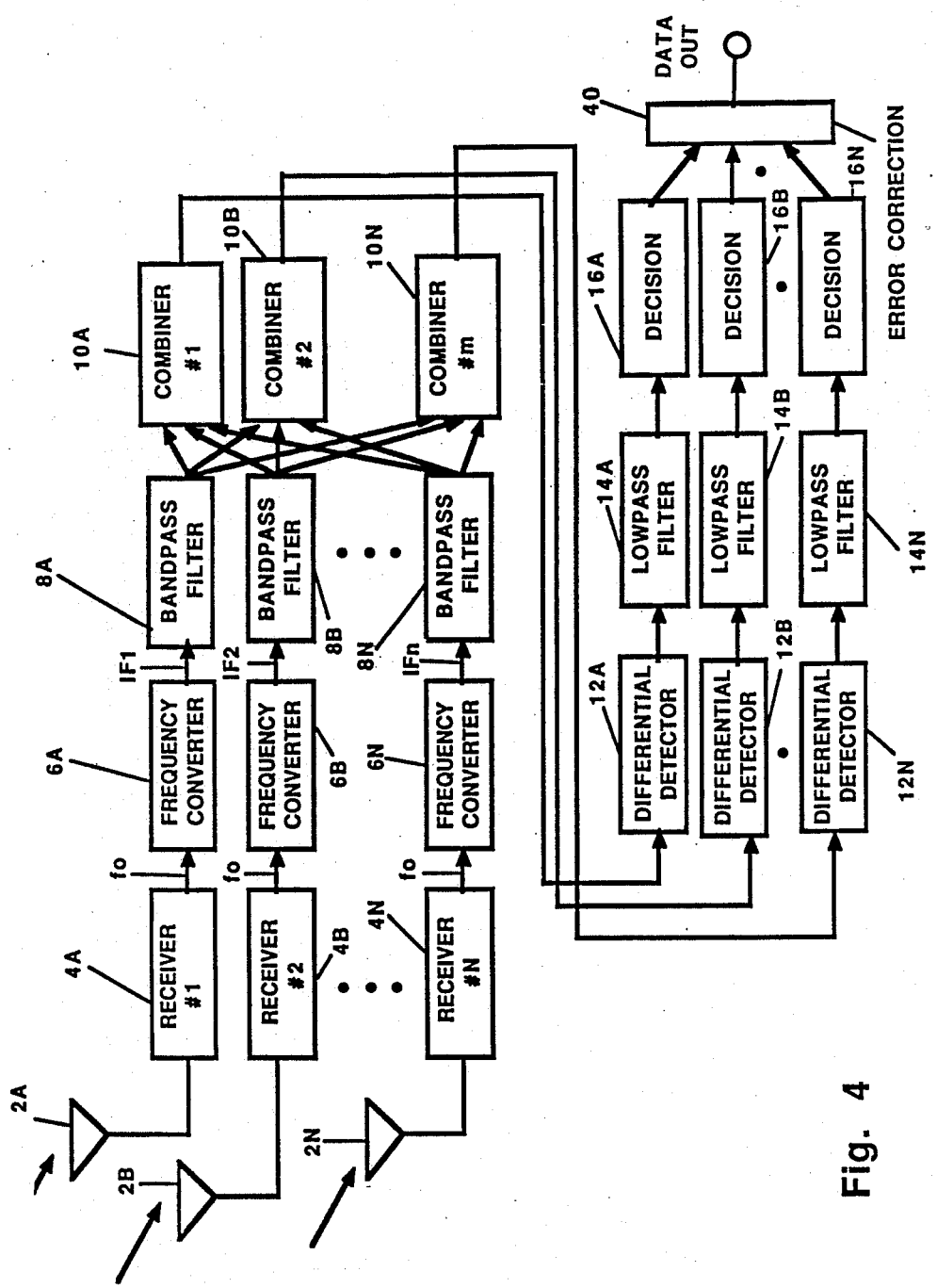
FIG. 4 is a block diagram illustrating a further alternative embodiment of the receiving system according to the present invention.

A further alternative embodiment is illustrated in FIG. 4, utilizing a plurality of combiner circuits 10A, 10B, . . . 10N, differential detectors with different delay times 12A, 12B, . . . 12N, low pass filters 14A, 14B, . . . 14N, and decision circuits 16A, 16B, . . . 16N disposed in each of the respective signal branches. An error correction circuit 40 is included for correcting errors in accordance with the method of performing a convolutional error correcting code on the received signals, in a well known manner, such as described for example in either of the articles of T. Masamura et al., entitled DIFFERENTIAL DETECTION OF MSK WITH NON-REDUNDANT ERROR CORRECTION, *IEEE Tran. Comm.* pp. 912–918, 1979, or S. Samejima et al., entitled DIFFERENTIAL PSK SYSTEM WITH NON-REDUNDANT ERROR CORRECTION, IEEE Journal on Selected Areas in Communications, pp. 74–81, 1983.

Also, whereas operation of the system according to the present invention is discussed herein with respect to receiving continuous phase frequency shift key (CPFSK) modulated data signals, the system may also be advantageously used to receive phase shift keyed (PSK) signals, wherein a sinusoidal carrier signal of fixed amplitude and frequency is phase modulated by +90° to represent a logical 1 symbol and −90° to represent a logical 0 symbol.

All such alternative embodiments and modifications are believed to be within the sphere and scope of the present invention as defined in the following claims.

I claim:

1. A diversity receiving system for receiving a digital signal transmitted at a predetermined signal symbol rate, comprised of:
    (a) a plurality of spaced apart receivers, each including an antenna, for receiving said signal via a plurality of transmission paths, and means for frequency translating the received signal from respective ones of said receivers and generating respective intermediate signals having frequencies displaced from each other by an integral multiple of said signal symbol rate,
    (b) means for combining said intermediate signals,
    (c) differential detector means for receiving said combined signals and generating a plurality of output cross or dot product signals in response thereto,
    (d) low pass filter means for filtering interference components of said cross product signals and generating a choherent signal in response thereto, and
    (e) decision circuit means for receiving said coherent signal and generating an output data signal in response thereto.

2. A system as defined in claim 1, wherein said means for frequency trnaslating the received signal from respective ones of said receivers is comprised of a plurality of mixers connected to respective ones of said receivers for adding said received signal to predetermined signals from respective local oscillators connected to said mixers each of said predetermined signals being displaced in frequency by an integral multiple of said symbol rate.

3. A system as defined in claim 2, wherein each of said plurality of receivers further includes amplifier means connected to said antenna, for amplifying said received digital signal.

4. A system as defined in claim 3 further including a plurality of band pass filters connected to respective ones of said mixers for filtering extraneous noise from said intermediate signals.

5. A system as defined in claim 1, wherein said means for frequency translating said received signal from respective ones of said receivers is comprised of a plurality of phase shifters connected to respective ones of said receivers for shifting the phase of the received signal at respective predetermined rates each proportional to an integral multiple of said signal symbol rate.

6. A system as defined in claim 5, wherein each of said receivers further includes amplifier means connected to said antenna, for amplifying said received digital signal.

7. A system as defined in claim 6, further including a bandpass filter connected to said amplifier means, for filtering extraneous noise from said intermediate signals.

8. A system as defined in claim 4, further including a plurality of switches connected to respective ones of said receivers and said means for combining, for operation in conjunction with a switch controller to disconnect predetermined ones of said receivers carrying heavily faded versions of said digital signal from said means for combining.

9. A system as defined in claim 4, including a plurality of said combining means connected to each of said bandpass filters and further including a plurality of said differential detectors connected to respective ones of said combining means, for delaying said combined signals by different lengths of time proportional to an integral number of symbol periods, and an error correction circuit connected to said decision circuits for effecting convolutional error correcting of said output data signals.

10. A system as defined in claim 1, wherein said digital signal is a minimum shift key modulated data signal.

11. A system as defined in claim 1, wherein said digital signal is a phase shift key modulated data signal.

12. A system as defined in claim 1, wherein said digital signal is a continuous phase frequency shift key modulated data signal.

13. A system as defined in claim 4, wherein said digital signal is a minimum shift key modulated data signal.

14. A system as defined in claim 7, wherein said digital signal is a minimum shift key modulated data signal.

15. A system as defined in claim 4, wherein said digital signal is a phase shift key modulated data signal.

16. A system as defined in claim 7, wherein said digital signal is a phase shift key modulated data signal.

17. A system as defined in claim 4, wherein said digital signal is a continuous phase frequency shift key modulated data signal.

18. A system as defined in claim 7, wherein said digital signal is a continuous phase frequency shift key modulated data signal.

* * * * *